United States Patent
Ji et al.

(10) Patent No.: US 9,845,844 B2
(45) Date of Patent: Dec. 19, 2017

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Gyeonggi-do (KR); Seong Wook Hwang, Gyeonggi-do (KR); Hyun Sik Kwon, Seoul (KR); Wonmin Cho, Gyeonggi-do (KR); Jae Chang Kook, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/211,551

(22) Filed: Jul. 15, 2016

(65) Prior Publication Data
US 2017/0268603 A1    Sep. 21, 2017

(30) Foreign Application Priority Data

Mar. 16, 2016   (KR) ........................ 10-2016-0031479

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC ..... F16H 2200/2012; F16H 2200/2046; F16H 2200/2097
See application file for complete search history.

(56) References Cited

U.S. PATENT DOCUMENTS

| | | | |
|---|---|---|---|
| 7,993,235 B2 | 8/2011 | Wittkopp et al. | |
| 2008/0108473 A1* | 5/2008 | Shim | F16H 3/66 475/276 |
| 2010/0240488 A1* | 9/2010 | Carey | F16H 3/66 475/276 |
| 2012/0329600 A1* | 12/2012 | Park | F16H 3/66 475/276 |
| 2017/0114866 A1* | 4/2017 | Oh | F16H 3/66 |

* cited by examiner

*Primary Examiner* — Tisha Lewis
(74) *Attorney, Agent, or Firm* — Mintz Levin Cohn Ferris Glovsky and Popeo, P.C.; Peter F. Corless

(57) ABSTRACT

A planetary gear train of an automatic transmission for a vehicle is provided. Ten or more forward speeds and one or more reverse speed are achieved by a planetary gear train of an automatic transmission for a vehicle including an input shaft, an output shaft, four planetary gear sets respectively, having three rotational elements, and six control elements to selectively interconnect the rotational elements and a transmission housing.

8 Claims, 2 Drawing Sheets

FIG. 2

| Shift-stage | Control element | | | | | | Gear ratio |
|---|---|---|---|---|---|---|---|
| | C1 | C2 | C3 | C4 | C5 | B1 | |
| D1 | | | | ● | ● | ● | 5.105 |
| D2 | ● | | | | ● | ● | 3.305 |
| D3 | ● | ● | | | | ● | 2.210 |
| D4 | ● | | | ● | | ● | 1.931 |
| D5 | ● | ● | | ● | | | 1.535 |
| D6 | ● | | | ● | ● | | 1.201 |
| D7 | ● | | ● | ● | | | 1.000 |
| D8 | ● | ● | ● | | | | 0.854 |
| D9 | | ● | ● | ● | | | 0.734 |
| D10 | | | ● | ● | ● | | 0.623 |
| REV | | | ● | ● | | ● | 2.800 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031479 filed in the Korean Intellectual Property Office on Mar. 16, 2016, the entire contents of which are incorporated herein by reference.

BACKGROUND (a) Field of the Invention

The present invention relates to an automatic transmission for a vehicle and more particularly, to a planetary gear train of an automatic transmission for a vehicle that minimizes complexity, realizing at least ten forward speeds, improves power delivery performance and fuel consumption due to multi-stages, and improves driving stability of a vehicle by utilizing a low rotation speed of an engine.

(b) Description of the Related Art

Generally, in the automatic transmission field achieving a greater number of shift stages is a technology that maximizes fuel consumption and driving efficiency and has been researched, to reduce fuel consumption of a vehicle. In particular, research regarding an engine has been concluded to reduce the weight of the vehicle and to improve fuel efficiency and thereby reduce fuel consumption. Further research regarding an automatic transmission has been conducted to simultaneously improve drivability and fuel consumption by achieving a greater number of shift stages.

For example, to achieve more shift stages for an automatic transmission, the number of components, particularly the number of planetary gear sets is typically increased and installability, production cost, weight, and/or power flow efficiency according to total length of transmission is increased. Therefore, in order to maximally enhance fuel consumption of an automatic transmission having more shift stages, improved efficiency must include a smaller number of components. Recently, an eight-speed automatic transmission has been introduced and a planetary gear train for an automatic transmission enabling more shift stages is continuously required.

However, the majority of general automatic transmissions have more than eight speeds and typically include three to four planetary gear sets and five to six control elements (e.g., friction element). In other words, the total length is increased, which has drawbacks including deterioration of installability. As a result, multiple rows structure which planetary gear sets are on planetary gear sets have been adopted or in other words a dog clutch has been applied in place of wet control elements. However, applicable structure is restricted and shift feel deteriorates by application of the dog clutch.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle with shift-stages of at least the forward ten speeds and at least one reverse speed and reduces the number of components, improves power delivery performance and fuel consumption by multi-stages of an automatic transmission and improves driving stability of a vehicle by utilizing a lower rotation speed of an engine.

A planetary gear train according to an exemplary embodiment of the present invention may include an input shaft configured to receive an engine torque, an output shaft configured to output a shifted torque, a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, a first shaft connected with the first rotational element and directly coupled to a transmission housing, a second shaft that interconnects the second rotational element and the fourth rotational element and directly coupled to the input shaft, and a third shaft interconnects the third rotational element and the tenth rotational element. Further, the present invention may include, a fourth shaft connected with the fifth rotational element, a fifth shaft connected with the sixth rotational element, a sixth shaft that interconnects the seventh rotational element and the eleventh rotational element and directly coupled to the output shaft, a seventh shaft coupled to the eighth rotational element and selectively coupled to the fourth shaft and the fifth shaft respectively; an eighth shaft connected with the ninth rotational element and selectively coupled to the fifth shaft, and a ninth shaft connected with the twelfth rotational element and selectively coupled to the fourth shaft and the eighth shaft respectively. The fourth shaft may be selectively coupled to the transmission housing.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set, respectively. The seventh, eighth, and ninth rotational elements of the third planetary gear set may be a third sun gear, a third planet carrier, and a third ring gear of the third planetary gear set, respectively. The tenth, eleventh, and twelfth rotational elements of the fourth planetary gear set may be a fourth sun gear, a fourth planet carrier, and a fourth ring gear of the fourth planetary gear set, respectively.

A planetary gear train according to an exemplary embodiment of the present invention may further include a first clutch selectively coupled to the fourth shaft and the seventh shaft, a second clutch selectively coupled to the fourth shaft and the ninth shaft, a third clutch selectively coupled to the fifth shaft and the seventh shaft, a fourth clutch selectively coupled to the fifth shaft and the eighth shaft, a fifth clutch selectively coupled to the eighth shaft and the ninth shaft; and a first brake selectively coupled to the fourth shaft and the transmission housing.

According to an exemplary embodiment of the present invention, shift-stages of at least forward ten speeds and at least one reverse speed may be realized by combination of four planetary gear sets of simple planetary gear sets and six control elements. Additionally, a planetary gear train according to an exemplary embodiment of the present invention may be configured to generate shift stages appropriate for rotation speed of an engine due to multi-stages of an automatic transmission and may improve driving stability of a vehicle by utilizing a low rotation speed of an engine. Further, a planetary gear train according to an exemplary embodiment of the present invention may maximize engine driving efficiency by multi-stages of an automatic transmission and may improve power delivery performance and fuel consumption.

Further, effects that may be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is an exemplary operational chart for respective control elements at respective shift stages in a planetary gear train according to an exemplary embodiment of the present invention.

DESCRIPTION OF SYMBOLS

Figure 1:
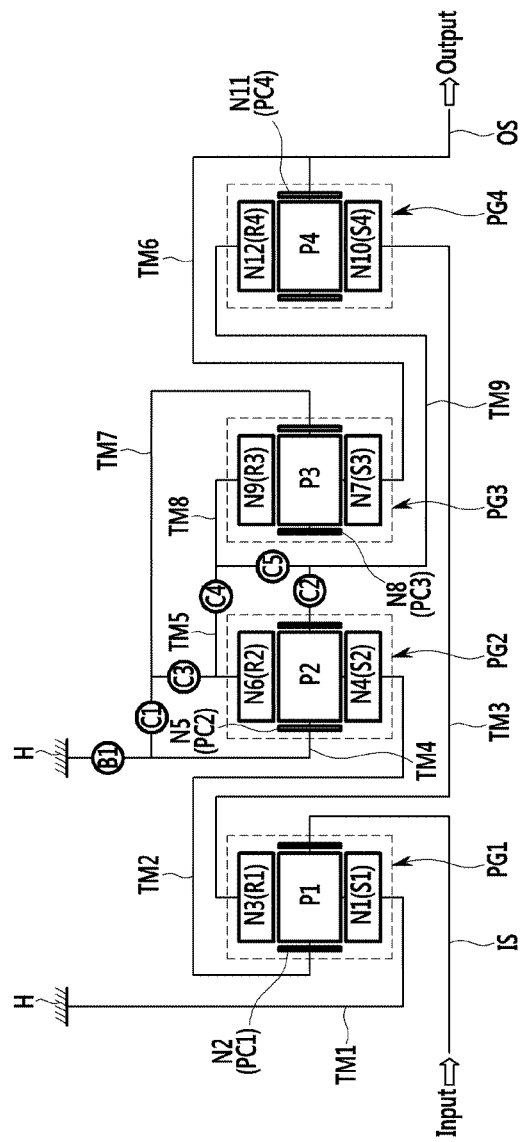
FIG. 1 is an exemplary schematic diagram of a planetary gear train according to an exemplary embodiment of the present invention.

B1 first brake
C1 first clutch
C2 second clutch
C3 third clutch
C4. fourth clutch
C5. fifth clutch
PG1 first planetary gear set
PG2 second planetary gear set
PG3 third planetary gear set
PG4. fourth planetary gear set
S1 first sun gear
S2 second sun gear
S3 third sun gear
S4 fourth sun gear
PC1 first planet carrier
PC2 second planet carrier
PC3 third planet carrier
PC4. fourth planet carrier
R1 first ring gear
R2 second ring gear
R3 third ring gear
R4. fourth ring gear
IS. input shaft
OS. output shaft
TM1 first shaft
TM2 second shaft
TM3 third shaft
TM4 fourth shaft
TM5 fifth shaft
TM6 sixth shaft
TM7 seventh shaft
TM8 eight shaft
TM9. ninth shaft

DETAILED DESCRIPTION

Hereinafter, an exemplary embodiment of the present invention will be described in detail with reference to drawings. The drawings and description are to be regarded as illustrative in nature and not restrictive, and like reference numerals designate like elements throughout the specification. In the following description, dividing names of components into first, second, and the like is to divide the names because the names of the components are the same as each other and an order thereof is not particularly limited.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary schematic diagram of a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 arranged on a same axis, an input shaft IS, an output shaft OS, nine shafts TM1 to TM9 interconnecting rotational elements of the first, second, third, and fourth planetary gear sets PG1, PG2, PG3, and PG4, five clutches C1 to C5 and one brake B1 as control elements, and a transmission housing H.

Torque input from the input shaft IS may be shifted by cooperative operation of the first, second, third, and fourth planetary gear sets PG1, PG2, PG3, and PG4, and may then be configured to be output through the output shaft OS. The simple planetary gear sets may be arranged in the order of first, first, second, third and fourth planetary gear sets PG1, PG2, PG3 and PG4, from an engine side. The input shaft IS may be an input member and the torque from a crankshaft of an engine, after being torque-converted by a torque converter, may be configured to be input into the input shaft IS. The output shaft OS may be an output member and may be arranged on a same axis with the input shaft IS and may be configured to deliver a shifted torque to a drive shaft through a differential apparatus.

The first planetary gear set PG1 may be a double pinion planetary gear set and may include a first sun gear S1, a first planet carrier PC1 configured to support a first pinion P1 externally engaged with the first sun gear S1 and a first ring gear R1 may be configured to internally engage with the first pinion P1. The first sun gear S1 may be operated a first rotational element N1, the first planet carrier PC1 may be configured to be a second rotational element N2 and the first ring gear R1 may be configured to be a third rotational element N3. The second planetary gear set PG2 may be a single pinion planetary gear set and may include a second sun gear S2, a second planet carrier PC2 that supports a second pinion P2 externally engaged with the second sun gear S2 and a second ring gear R2 may be configured to internally engage with the second pinion P2. The second sun gear S2 may be configured to operate as a fourth rotational element N4, the second planet carrier PC2 may be configured to operate as a fifth rotational element N5, and the second ring gear R2 may be configured to operate as a sixth rotational element N6.

The third planetary gear set PG3 may be a single pinion planetary gear set, and may include a third sun gear S3, a third planet carrier PC3 that supports a third pinion P3 to externally engage with the third sun gear S3, and a third ring gear R3 may be configured to internally engage with the third pinion P3. The third sun gear S3 may be configured to be a seventh rotational element N7, the third planet carrier PC3 may be configured to be an eighth rotational element N8, and the third ring gear R3 may be configured to be a ninth rotational element N9. The fourth planetary gear set PG4 may be a single pinion planetary gear set, and may include a fourth sun gear S4, a fourth planet carrier PC4 that supports a fourth pinion P4 to externally engage with the fourth sun gear S4, and a fourth ring gear R4 may be configured to internally engage with the fourth pinion P4. The fourth sun gear S4 may be configured to be a tenth rotational element N10, the fourth planet carrier PC4 may be configured to be a eleventh rotational element N11, and the fourth ring gear R4 may be configured to be a twelfth rotational element N12.

In the arrangement of the first, second, third, and fourth planetary gear sets PG1, PG2, PG3, and PG4, the second rotational element N2 may be directly coupled to the fourth rotational element N4, the third rotational element N3 may be directly coupled with the tenth rotational element N10, the seventh rotational element N7 may be directly connected with the eleventh rotational element N11 by nine shafts TM1 to TM9. The nine shafts TM1 to TM9 may be arranged as follows. Each of the nine shafts TM1 to TM9 may be a rotational member that interconnects the input and output shafts and rotational elements of the planetary gear sets PG1, PG2, PG3, and PG4, or may be a fixed member fixed to the transmission housing H.

The first shaft TM1 may be configured to interconnect the first rotational element N1 (e.g., the first sun gear S1) and may be directly coupled to the transmission housing H, to operate as a fixed element. The second shaft TM2 may directly couple the second rotational element N2 (e.g., the first planet carrier PC1) and the fourth rotational element N4 (e.g., the second ring gear R2), and may be directly coupled to the input shaft IS, to operate as an input element. The third shaft TM3 may be directly coupled with the third rotational element N3 (e.g., first ring gear R1) and the tenth rotational element N10 e.g., fourth sun gear S4). The fourth shaft TM4 may be coupled with the fifth rotational element N5 (e.g., second planet carrier PC2), and may be selectively coupled to the transmission housing H, thereby acting as a selective fixed element.

The fifth shaft TM5 may be coupled to the sixth rotational element N6 (e.g., second ring gear R2). The sixth shaft TM6 may directly couple the seventh rotational element N7 (e.g., third sun gear S3) and the eleventh rotational element N11 (e.g., fourth planet carrier PC4), and may be directly coupled to the output shaft OS, and may be configured to operate as an output element. The seventh shaft TM7 may be coupled to the eighth rotational element N8 (e.g., third planet carrier PC3), and may be selectively coupled to the fourth shaft TM4 and the fifth shaft TM5, respectively. The eighth shaft TM8 may be coupled to the ninth rotational element N9 (e.g., third ring gear R3), and may be selectively coupled to the fifth shaft TM5. The ninth shaft TM9 may be coupled to the twelfth rotational element N12 (e.g., fourth ring gear R4), and may be selectively coupled to the fourth shaft TM4 and the eighth shaft TM8, respectively.

The nine shafts TM1 to TM9, the input shaft IS and the output shaft OS may be selectively interconnected with one another by control elements of five clutches C1, C2, C3, C4, and C5. The shafts TM1 to TM9 may be selectively connected with the transmission housing H, by control elements of one brake B1.

The five clutches C1 to C5 and the one brake B1 may be arranged as follows. The first clutch C1 may be disposed between the fourth shaft TM4 and the seventh shaft TM7, to selectively couple the fourth shaft TM4 and the seventh shaft TM7 for power delivery. The second clutch C2 may be disposed between the fourth shaft TM4 and the ninth shaft TM9, to selectively couple the fourth shaft TM4 and the ninth shaft TM9 for power delivery. The third clutch C3 may be disposed between the fifth shaft TM5 and the seventh shaft TM7, to selectively couple the fifth shaft TM5 and the seventh shaft TM7 for power delivery. The fourth clutch C4 may be disposed between the fifth shaft TM5 and the eighth shaft TM8, to selectively couple the fifth shaft TM5 and the eighth shaft TM8 for power delivery. The fifth clutch C5 may be disposed between the eighth shaft TM8 and the ninth shaft TM9, to selectively couple the eighth shaft TM8 and the ninth shaft TM9 for power delivery.

The first brake B1 may be disposed between the fourth shaft TM4 and the transmission housing H, and may be configured to operates a fixed element through selective coupling of the fourth shaft TM4 to the transmission housing H. The control elements of the first, second, third, fourth, and fifth clutches C1, C2, C3, C4, and C5 and the first brake B1 may be realized as multi-plate hydraulic pressure friction devices that may be configured to frictionally engage via hydraulic pressure.

FIG. 2 is an exemplary operational chart for respective control elements at respective shift stages in a planetary gear train according to an exemplary embodiment of the present invention. Referring to FIG. 2, a planetary gear train according to an exemplary embodiment of the present invention may provide forward ten speeds and one reverse speed by operation of three control elements among the first, second, third, fourth, and fifth clutches C1, C2, C3, C4 and C5 and the first brake B1 at respective shift-stages.

In the forward first speed shift-stage D1, the fourth and fifth clutches C4 and C5 and the first brake B1 may be operated simultaneously. Accordingly, the fifth shaft TM5 may be interconnected with the eighth shaft TM8 by the operation of the fourth clutch C4. The eighth shaft TM8 may be interconnected with the ninth shaft TM9 by the operation of the fifth clutch C5. In other words, torque of the input shaft IS may be configured to be input to the second shaft TM2 and the first shaft TM1 may be directly connected with the transmission housing H and may be configured to operate as a fixed element. The fourth shaft TM4 may be configured to operate as a fixed element by the operation of the first brake B1. Accordingly, the forward first speed may be generated and a shifted torque may be output through the output shaft OS connected with the sixth shaft TM6.

In the forward second speed shift-stage D2, the first and fifth clutches C1 and C5 and the first brake B1 may be operated simultaneously. Accordingly, the fourth shaft TM4 may be interconnected with the seventh shaft TM7 by the operation of the first clutch C1. The eighth shaft TM8 may be interconnected with the ninth shaft TM9 by the operation of the fifth clutch C5. When the torque of the Input shaft IS is input to the second shaft TM2, the first shaft TM1 may be directly connected with the transmission housing H and may be configured to operate as a fixed element and the fourth shaft TM4 may be configured to operate as a fixed element by the operation of the first brake B1. Accordingly, the forward second speed and a shifted torque may be configured to be output through the output shaft OS coupled to the sixth shaft TM6.

In particular, the forward third speed shift-stage D3, the first and second clutches C1 and C2 and the first brake B1 may be operated simultaneously. For example, the fourth shaft TM4 may be interconnected with the seventh shaft TM7 by the operation of the first clutch C1. The fourth shaft TM4 may be interconnected with the ninth shaft TM9 by the operation of the second clutch C2. The torque of the Input shaft IS may be input to the second shaft TM2, and the first shaft TM1 may be directly coupled to the transmission housing H and may be configured to operate as a fixed element and the fourth shaft TM4 may be configured to operate as a fixed element by the operation of the first brake B1. Accordingly, the forward third speed and a shifted torque may be output through the output shaft OS coupled to the sixth shaft TM6.

In the forward fourth speed shift-stage D4, the first and fourth clutches C1 and C4 and the first brake B1 may be operated simultaneously. For example, the fourth shaft TM4 may be interconnected with the seventh shaft TM7 by the operation of the first clutch C1.

The fifth shaft TM5 may be interconnected with the eighth shaft TM8 by the operation of the fourth clutch C4. In particular, torque of the Input shaft IS may be input to the second shaft TM2 and the first shaft TM1 may be directly coupled to the transmission housing H and may be configured to operate as a fixed element. Further, the fourth shaft TM4 may be configured to operate as a fixed element by the operation of the first brake B1, thereby realizing the forward fourth speed and may be configured to output a shifted torque through the output shaft OS coupled to the sixth shaft TM6.

In the forward fifth speed shift-stage D5, the first, second, and fourth clutches C1, C2, and C4 may be operated simultaneously. Accordingly, the fourth shaft TM4 may be interconnected with the seventh shaft TM7 by the operation of the first clutch C1. The fourth shaft TM4 may be interconnected with the ninth shaft TM9 by the operation of the second clutch C2. The fifth shaft TM5 may be interconnected with the eighth shaft TM8 by the operation of the fourth clutch C4. When torque of the Input shaft IS is input to the second shaft TM2 the first shaft TM1 may be directly coupled to the transmission housing H and may be configured to operate as a fixed element. Accordingly, the forward fifth speed and a shifted torque may be output through the output shaft OS coupled to the sixth shaft TM6.

In the forward sixth speed shift-stage D6, the first, fourth, and fifth clutches C1, C4, and C5 may be simultaneously operated. As a result, the fourth shaft TM4 may be interconnected with the seventh shaft TM7 by the operation of the first clutch C1. The fifth shaft TM5 may be interconnected with the eighth shaft TM8 by the operation of the fourth clutch C4. The eighth shaft TM8 may be interconnected with the ninth shaft TM9 by the operation of the fifth clutch C5. When torque of the Input shaft IS is input to the second shaft TM2 the first shaft TM1 may be directly coupled to the transmission housing H and may be configured to operate as a fixed element and may be configured to operate the forward sixth speed and may be further be configured to output a shifted torque through the output shaft OS coupled to the sixth shaft TM6.

In the forward seventh speed shift-stage D7, the first, third, and fourth clutches C1, C3, and C4 may be operated simultaneously. As a result, the fourth shaft TM4 may be interconnected with the seventh shaft TM7 by the operation of the first clutch C1. The fifth shaft TM5 may be interconnected with the seventh shaft TM7 by the operation of the third clutch C3. The fifth shaft TM5 may be interconnected with the eighth shaft TM8 by the operation of the fourth clutch C4. In particular, second and third planetary gear sets PG2 and PG3 may be configured to integrally rotate and a torque input through the second shaft TM2 may be output as input. The first shaft TM1 may be directly coupled to the transmission housing H and may be configured to operate as a fixed element, thereby forming the forward seventh speed and may be configured to output the inputted torque to the output shaft OS connected with the sixth shaft TM6.

In the forward eighth speed shift-stage D8, the first, second, and third clutches C1, C2, and C3 may be operated simultaneously. As a result, the fourth shaft TM4 may be interconnected with the seventh shaft TM7 by the operation of the first clutch C1. The fourth shaft TM4 may be interconnected with the ninth shaft TM9 by the operation of the second clutch C2. The fifth shaft TM5 may be interconnected with the seventh shaft TM7 by the operation of the third clutch C3. When torque of the Input shaft IS is input to the second shaft TM2 the first shaft TM1 directly connected with the transmission housing H operates as a fixed element, thereby realizing the forward eighth speed and the output shaft OS connected with the sixth shaft TM6 may be configured to output a shifted torque.

In the forward ninth speed shift-stage D9, the second, third, and fourth clutches C2, C3, and C4 may be simultaneously operated. As a result, the fourth shaft TM4 may be interconnected with the ninth shaft TM9 by the operation of the second clutch C2. The fifth shaft TM5 may be interconnected with the seventh shaft TM7 by the operation of the third clutch C3. The fifth shaft TM5 may be interconnected with the eighth shaft TM8 by the operation of the fourth clutch C4. When torque of the Input shaft IS is input to the second shaft TM2 the first shaft TM1 may be directly coupled to the transmission housing H and may be configured to operate as a fixed element, and may be configured to operate a forward ninth speed. Further, the output shaft OS coupled to the sixth shaft TM6 may be configured to output a shifted torque.

In the forward tenth speed shift-stage D10, the third, fourth, and fifth clutches C3, C4, and C5 may be simultaneously operated. As a result, the fifth shaft TM5 may be interconnected with the seventh shaft TM7 by the operation of the third clutch C3. The fifth shaft TM5 may be interconnected with the eighth shaft TM8 by the operation of the fourth clutch C4. The eighth shaft TM8 may be interconnected with the ninth shaft TM9 by the operation of the fifth clutch C5. When torque of the Input shaft IS is input to the second shaft TM2 the first shaft TM1 may be directly coupled to the transmission housing H and may be configured to operate as a fixed element, and may be configured to operate the forward tenth speed and the output shaft OS coupled to the sixth shaft TM6 may be configured to output a shifted torque.

In the reverse speed REV, the third and fourth clutches C3 and C4 and the first brake B1 may be operated simultaneously. As a result, the fifth shaft TM5 may be interconnected with the seventh shaft TM7 by the operation of the third clutch C3. The fifth shaft TM5 may be interconnected with the eighth shaft TM8 by the operation of the fourth clutch C4. When torque of the Input shaft IS is input to the second shaft TM2 the first shaft TM1 may be directly coupled to the transmission housing H and may be configured to operate as a fixed element and the fourth shaft TM4 may be configured to operate as a fixed element by the operation of the first brake B1, thereby realizing the reverse speed and outputting a shifted torque through the output shaft OS coupled to the sixth shaft TM6 may be configured to output a shifted torque.

As described above, a planetary gear train according to an exemplary embodiment of the present invention may be configured to operate at least forward ten speeds and at least one reverse speed formed by operation of four planetary gear sets PG1, PG2, PG3, and PG4 that may be configured to be controlled by the five clutches C1, C2, C3, C4, and C5 and the one brake B1. Additionally, a planetary gear train according to an exemplary embodiment of the present invention may be configured to operate shift stages appropriate for rotation speed of an engine due to multi-stages of an automatic transmission and may improve driving stability of a vehicle by utilizing a low rotation speed of an engine. Further, a planetary gear train according to an exemplary embodiment of the present invention may maximize engine driving efficiency by multi-stages of an automatic transmission, and may improve power delivery performance and fuel consumption.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft coupled to the first rotational element and directly coupled to a transmission housing;
   a second shaft interconnecting the second rotational element and the fourth rotational element and directly coupled to the input shaft;
   a third shaft interconnecting the third rotational element and the tenth rotational element;
   a fourth shaft coupled to the fifth rotational element;
   a fifth shaft coupled to the sixth rotational element;
   a sixth shaft interconnecting the seventh rotational element and the eleventh rotational element and directly coupled to the output shaft;
   a seventh shaft coupled to the eighth rotational element and selectively coupled to the fourth shaft and the fifth shaft, respectively;
   an eighth shaft coupled to the ninth rotational element and selectively coupled to the fifth shaft; and
   a ninth shaft coupled to the twelfth rotational element and selectively coupled to the fourth shaft and the eighth shaft, respectively.

2. The planetary gear train of claim 1, wherein the fourth shaft is selectively coupled to the transmission housing.

3. The planetary gear train of claim 1, wherein:
   the first, second, and third rotational elements of the first planetary gear set are a first sun gear, a first planet carrier and a first ring gear of the first planetary gear set;
   the fourth, fifth, and sixth rotational elements of the second planetary gear set are a second sun gear, a second planet carrier, and a second ring gear of the second planetary gear set;
   the seventh, eighth, and ninth rotational elements of the third planetary gear set are a third sun gear, a third planet carrier, and a third ring gear of the third planetary gear set; and
   the tenth, eleventh, and twelfth rotational elements of the fourth planetary gear set are a fourth sun gear, a fourth planet carrier, and a fourth ring gear of the fourth planetary gear set.

4. The planetary gear train of claim 2, further comprising:
   a first clutch selectively coupled to the fourth shaft and the seventh shaft;
   a second clutch selectively coupled to the fourth shaft and the ninth shaft;
   a third clutch selectively coupled to the fifth shaft and the seventh shaft;
   a fourth clutch selectively coupled to the fifth shaft and the eighth shaft;
   a fifth clutch selectively coupled to the eighth shaft and the ninth shaft; and
   a first brake selectively coupled to the fourth shaft and the transmission housing.

5. A planetary gear train of an automatic transmission for a vehicle, comprising:
   an input shaft configured to receive an engine torque;
   output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements; and
   a fourth planetary gear set having tenth, eleventh, and twelfth rotational elements,
   wherein the input shaft is directly coupled to the fourth rotational element,
   the output shaft is directly coupled to the eleventh rotational element,
   the first rotational element is directly coupled to the transmission housing,
   the second rotational element is directly coupled to the fourth rotational element, the third rotational element is directly coupled to the tenth rotational element, the seventh rotational element is directly coupled to the eleventh rotational element, the eighth rotational element is selectively coupled to the fifth rotational element and the sixth rotational element respectively, the ninth rotational element is selectively coupled to the sixth rotational element, and the twelfth rotational element is selectively coupled to the fifth rotational element and the ninth rotational element.

6. The planetary gear train of claim 5, wherein the fifth rotational element is selectively coupled to the transmission housing.

7. The planetary gear train of claim 5, wherein:

the first, second, and third rotational elements of the first planetary gear set are a first sun gear, a first planet carrier, and a first ring gear of the first planetary gear set;

the fourth, fifth, and sixth rotational elements of the second planetary gear set are a second sun gear, a second planet carrier, and a second ring gear of the second planetary gear set;

the seventh, eighth, and ninth rotational elements of the third planetary gear set are a third sun gear, a third planet carrier, and a third ring gear of the third planetary gear set; and the tenth, eleventh, and twelfth rotational elements of the fourth planetary gear set are a fourth sun gear, a fourth planet carrier, and a fourth ring gear of the fourth planetary gear set.

8. The planetary gear train of claim 6, further comprising:

a first clutch selectively coupled to the fifth rotational element and the eighth rotational element;

a second clutch selectively coupled to the fifth rotational element and the twelfth rotational element;

a third clutch selectively coupled to the sixth rotational element and the eighth rotational element;

a fourth clutch selectively coupled to the sixth rotational element and the ninth rotational element;

a fifth clutch selectively coupled to the ninth rotational element and the twelfth rotational element; and a second brake selectively coupled to the fourth rotational element and the transmission housing.

\* \* \* \* \*